US005192389A

United States Patent [19]

Martin

[11] Patent Number: 5,192,389

[45] Date of Patent: * Mar. 9, 1993

[54] APPARATUS FOR PREPARING A SELF-MAILER HAVING PRINTER, FOLDER, AND TRANSPORT MEANS

[75] Inventor: Samuel W. Martin, Weston, Conn.

[73] Assignee: Pitney Bowes Inc., Stamford, Conn.

[ * ] Notice: The portion of the term of this patent subsequent to Sep. 17, 2008 has been disclaimed.

[21] Appl. No.: 782,749

[22] Filed: Oct. 18, 1991

Related U.S. Application Data

[63] Continuation of Ser. No. 407,583, Sep. 14, 1989.

[51] Int. Cl.[5] ........................ B32B 31/00; B43M 3/00

[52] U.S. Cl. ................................ 156/364; 156/442.1; 156/387; 156/443; 283/116; 493/421; 493/337

[58] Field of Search ........................ 283/106, 56, 116; 156/364, 441.5, 442.1, 384, 383, 387, 443, 217, 227; 493/394, 420, 421, 334, 386, 336, 337; 53/562, 117, 450; 355/321, 324; 346/134; 270/45

[56] References Cited

U.S. PATENT DOCUMENTS 2,279,164 4/1942 Gettleman ........................ 283/56 X
3,265,382 7/1966 Sherman ........................ 270/45
3,272,095 8/1963 Heuff ........................ 93/61
3,510,122 5/1970 Gavaghan ........................ 270/68
3,820,447 6/1974 Gendron ........................ 93/73
3,853,041 12/1974 Lynas ........................ 93/61 A
3,975,009 7/1976 Brown ........................ 270/68 R
3,981,435 9/1976 Johnsen ........................ 229/69
3,995,808 12/1976 Kehoe ........................ 229/73
4,012,268 3/1977 Johnsen ........................ 156/200
4,031,818 6/1977 Kehoe ........................ 93/63 R
4,032,133 6/1977 Steffans et al. ........................ 270/68 A
4,063,398 12/1977 Huffman ........................ 53/31
4,067,171 1/1978 Herbert et al. ........................ 53/31
4,101,121 7/1978 Rastorguyeff ........................ 270/68
4,167,265 9/1979 Whittenberger ........................ 270/68 A
4,202,621 5/1980 Yoshimura ........................ 355/14 R
4,225,128 9/1980 Holyoke ........................ 270/68 A
4,348,101 9/1982 Schonfeld et al. ........................ 271/186 X
4,406,649 9/1983 Yamamura ........................ 493/421
4,411,643 10/1983 Higginson ........................ 493/188
4,573,672 3/1986 Lehmann et al. ........................ 270/45
4,619,101 10/1986 Havey, Jr. et al. ........................ 53/117
4,647,029 3/1987 Ohmori ........................ 270/45
4,701,155 10/1987 Ott ........................ 493/420
4,701,233 10/1987 Beck et al. ........................ 493/421
4,706,878 10/1987 Lubotta et al. ........................ 229/73
4,709,850 12/1987 Wagner ........................ 229/73
4,733,856 3/1988 Gunther, Jr. ........................ 270/1.1
4,776,510 10/1988 Jenkins ........................ 229/73
4,784,317 11/1988 Chen et al. ........................ 229/92.3
4,800,506 1/1989 Axelrod et al. ........................ 364/478
4,816,108 3/1989 Beck et al. ........................ 156/356
4,834,699 6/1989 Martin ........................ 493/421
4,875,965 10/1989 Marzullo ........................ 156/442.1
4,900,391 2/1990 Mandel et al. ........................ 493/420
5,049,227 9/1991 Long et al. ........................ 156/362

FOREIGN PATENT DOCUMENTS 2067170 7/1981 United Kingdom .
2081685 2/1982 United Kingdom .
2141411 12/1984 United Kingdom .

OTHER PUBLICATIONS

*Webster's II New Riverside University Dictionary,* Riverside Publishing Co., 1984, p. 277.
*PC Magazine,* vol. 7, No. 12, pp. 125, 167–175, 186, 187, 295.

*Primary Examiner*—David A. Simmons
*Assistant Examiner*—Chester T. Barry
*Attorney, Agent, or Firm*—Robert H. Whisker; Melvin J. Scolnick

[57] ABSTRACT

Apparatus for printing, folding, and sealing a one-piece form sheet to prepare a self-mailer. The apparatus includes a substantially conventional printer, which may be a laser printer, suitable for use with a personal computer. The printer is mounted above and outputs printed form sheets downwards to a folder sealer for folding and sealing to prepare a self-mailer. The folder sealer includes a folder having a central and peripheral rollers and curved, one-sided, open buckle chutes for folding the form sheet and delivering it to a transport which extends under the printer. The folder sealer also includes moistening apparatus for moistening areas on the form sheet to which a remoistenable glue has been applied.

21 Claims, 16 Drawing Sheets

APPARATUS FOR PREPARING A SELF-MAILER HAVING PRINTER, FOLDER, AND TRANSPORT MEANS

This application is a continuation of application Ser. No. 07/407,583, filed Sep. 14, 1989.

Related Applications

This application is one of the following group of co-pending, commonly assigned, applications, which were all filed on even date. These applications all relate to the development of an apparatus for printing, folding, and sealing a form sheet to prepare a self-mailer.

| Ser. No. | Title | Inventor | Attorney Docket No. |
|---|---|---|---|
| 407,391 | Moistening Apparatus | S. Supron | C-571 |
| 407,488 | Apparatus for Folding and Sealing a Form Along a Transverse Edge | S. Martin S. Supron | C-572 |
| 407,501 | Apparatus for Folding a Form Sheet | S. Martin S. Supron | C-573 |
| 407,583 | Apparatus for Preparing a Self-Mailer | S. Martin | C-574 |
| 407,400 | Apparatus Having a Diverter Responsive to Jams for Preparing a Self-Mailer and Method of Operating Same | D. Long S. Martin | C-575 |

BACKGROUND OF THE INVENTION

This invention relates to apparatus for producing self-mailers. More particularly, it relates to apparatus for printing, folding and sealing a form sheet to prepare a self-mailer.

Self-mailers, that is form sheets on which may be printed address information and message information and then folded and sealed to form a mail piece, are well known. U.S. Pat. No. 3,995,808; to: Kehoe; for: UNIT CONTAINING VARIABLE MESSAGES; issued: Dec. 7, 1976 discloses a form sheet which may be used to prepare a self-mailer. In the Kehoe patent, a form comprising a first portion which is folded about a second portion to form an envelope containing a second portion, on which a message may have been printed, is disclosed. In one embodiment taught by Kehoe, a web of paper stock is first printed, then appropriately cut and perforated, then adhesive is applied, then the web is folded along lines parallel to the direction of motion to form a continuous web of sealed envelopes, and the sealed envelopes cut to form separate mail pieces. While perhaps effective to produce great numbers of mail pieces from main frame computer output, it is readily apparent that, particularly because of the manner in which the paper stock is folded and then separated, the apparatus of Kehoe must be physically very large to prevent tearing of the paper stock during folding, as well as to provide for the additional steps of cutting and perforating and applying of adhesive. Kehoe does briefly disclose that single sheet forms may be printed on what Kehoe refers to as a computer-control copier, then folded and perforated and then placed in a window envelope. (Note Kehoe, Col. 7, lines 51-62). This clearly teaches away from the use of forms of Kehoe as a one-step self-mailer in an office environment.

U.S. Pat. No. 4,701,233; to: Beck et al.; for: METHOD FOR FOLDING AND SEALING SHEETS; issued: Oct. 20, 1987 discloses an apparatus for use with a facsimile system to assure privacy of a received document. A facsimile document is printed with message information in one portion and with the identity of the intended recipient in another portion, and then output to a folding and sealing apparatus. The document is then folded so that the message is not visible and the portion containing the identity is folded back to be visible. Means are provided in the apparatus of Beck et al. for selectively bypassing the folder sealer.

While Beck et al. does produce a document which is folded and sealed, it does not, however, produce a self-mailer as contemplated by the subject invention since Beck et al. does not produce anything which could be considered an envelope surrounding the message portion.

U.S. Pat. No. 4,202,621; to: Yoshimura et al.; for: RECORDING DEVICE; issued: May 13, 1980 discloses a xerographic copier which selectively outputs oversized copies to a folder for folding for easier storage. Again, it is clearly apparent that Yoshimura et al. does not produce a self-mailer.

Thus, it is an object of the subject invention to provide an apparatus for printing, folding and sealing a form sheet to produce a self-mailer.

It is another object of the subject invention to provide such an apparatus which is suitable for use with a personal computer.

It is still another object of the subject invention to provide such an apparatus which is compact and suitable for use in an office environment.

BRIEF SUMMARY OF THE INVENTION

The above objects are achieved and the disadvantages of the prior art are overcome in accordance with the subject invention by means of an apparatus for preparing a self-mailer which includes a printer, responsive to text signals defining information to be printed, for printing a form sheet with address information in a first portion, and a folder which receives the form sheet from the printer and folds the form sheet to prepare the self-mailer in such a manner that the self-mailer includes an envelope imprinted on its outer surface with the address and which encloses a second portion of the form sheet, and which also includes a tear-off strip whose removal separates the second portion from the envelope and simultaneously opens the envelope.

In a preferred embodiment of the subject invention, the printer is positioned above the folder and outputs the printed form downwards towards the folder, and the folder further includes apparatus for sealing the folded form sheet to prepare the self-mailer, and a transport for transporting the folded and sealed self-mailer to an output; the transport extending beneath the printer so as to reduce the "footprint" of the apparatus.

In another preferred embodiment of the subject invention, the apparatus includes a sheet feeder for selectively feeding either a form sheet or a sheet of letter stock in response to feed selection signals from a computer, a diverter for selectively directing the output of the printer either to the folder or to an alternative output for unfolded output, and a controller responsive to the feed selection signals for directing the output to the folder when the sheet feeder feeds a form sheet and to the alternative output when the sheet feeder feeds letter stock.

In still another preferred embodiment of the subject invention, the folder includes a central roller, a first roller forming a first nip with the central roller for capturing an input form sheet, a final roller forming a final nip with the central roller for transporting a self-mailer along an exit path, the exit path crossing the input path, and folding apparatus disposed intermediate the first and final rollers.

Thus, it can be seen that the subject invention advantageously achieves the above objects; particularly in that it produces an easily openable mail piece which is substantially similar to a conventional letter stock and envelope mail piece, and in that its novel configuration provides an apparatus which is compact and suitable for desk top use in an office environment.

Other objects and advantages of the subject invention will be readily apparent to those skilled rn the art from consideration of the attached drawings and the detailed description set forth below.

DETAILED DESCRIPTION OF PREFERRED EMBODIMENTS

Figure 1:
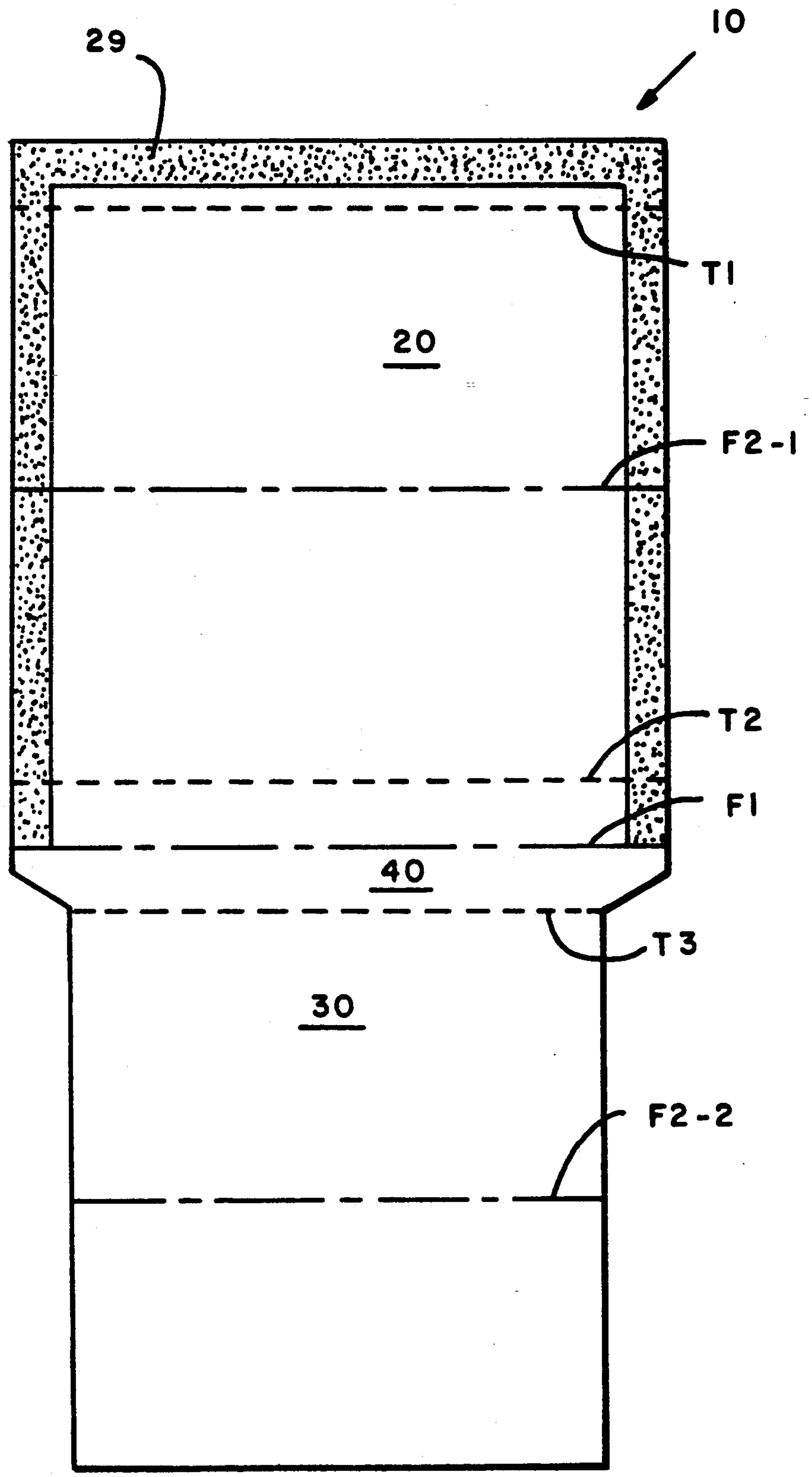
FIG. 1 shows the obverse side of a one piece form sheet which may be printed, folded, and sealed to prepare a self-mailer by apparatus in accordance with the subject invention.

FIG. 1 shows a plan view of the obverse side of a form sheet 10, which apparatus in accordance with the subject invention may print, fold and seal to prepare a self-mailer, as will be described further below. Form sheet 10 is described in more detail in commonly assigned, co-pending application Ser. No. 356,149, filed May 24, 1989 (C-543). Form sheet 10 includes a substantially rectangular upper portion 20 bounded at its lower edge by a fold line F1. Upper portion 20 also includes a second transverse fold line F2-1 parallel to line F1 and connecting the mid-points of its lateral edges. Form 10 is weakened in portion 20 by tear lines T1 and T2 located parallel to and equally spaced below the upper edge of portion 20 and fold line F1.

Adhesive 29 is applied in a strip adjacent to the lateral and upper edges of portion 20 to seal form 10 after folding, as will be described further below.

Form 10 also includes a continuous lower portion 30 for printing message information. At its upper edge, lower portion 30 is connected to connecting portion 40 along tear line T3 and also includes fold line F2-2 connecting the mid-points of the lateral edges of portion 30.

Connecting portion 40 extends from fold line F1 to tear line T3 to connect upper portion 20 and lower portion 30.

Figure 2:
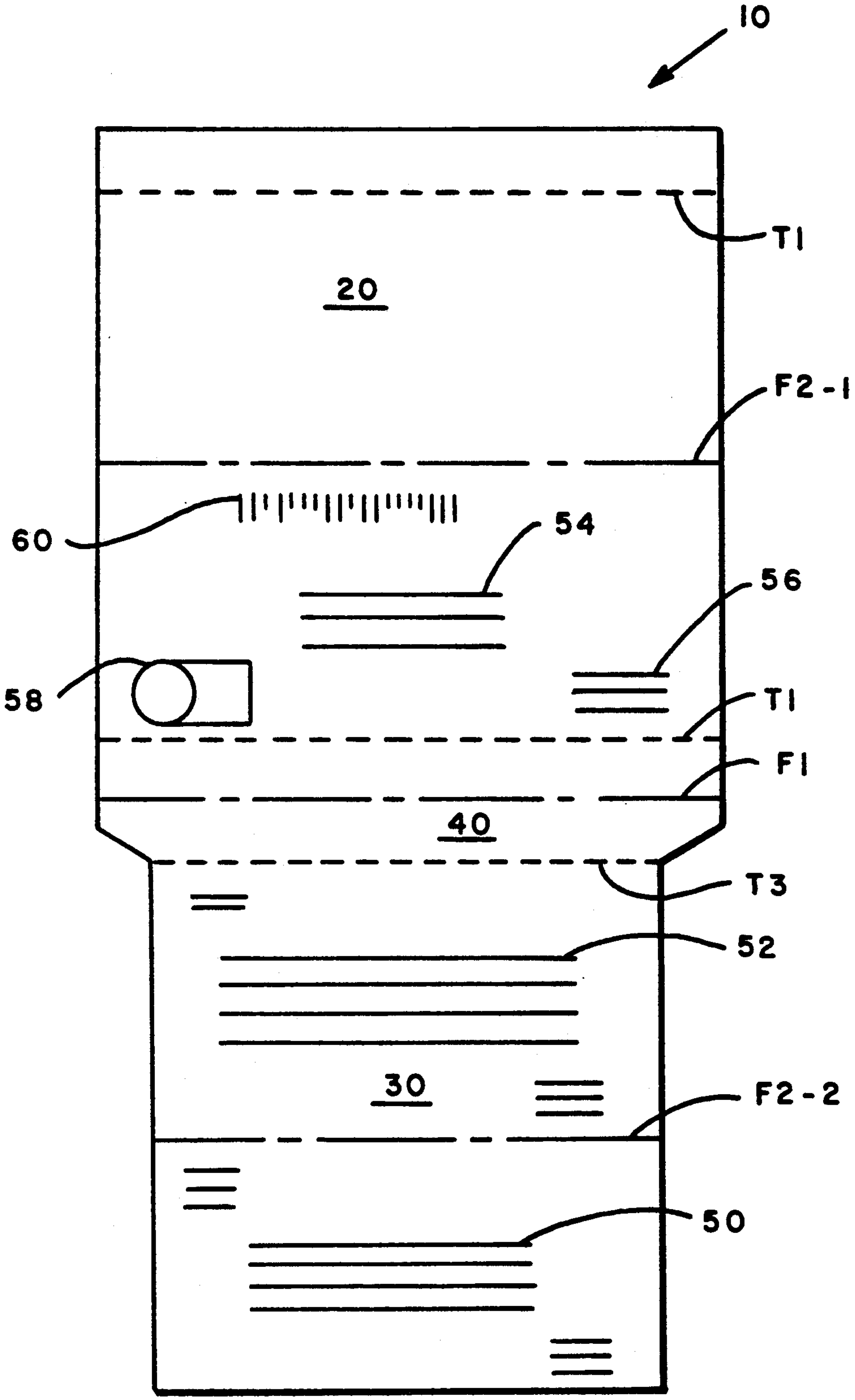
FIG. 2 shows the reverse side of the form sheet of FIG. 1.

FIG. 2 shows the reverse side of form 10. Lower portion 30 is printed with message information 50,52 on the reverse side. For example, message information 50 may be a bill or invoice, and message information 52 may be information for a return portion to be returned with payment. Upper portion 20 is printed between fold line F2-1 and tear line T2 with address information 54 and return address information 56, franking information 58, such as a penalty mail permit number, and bar code information 60 to facilitate handling by the postal service.

Figure 3:
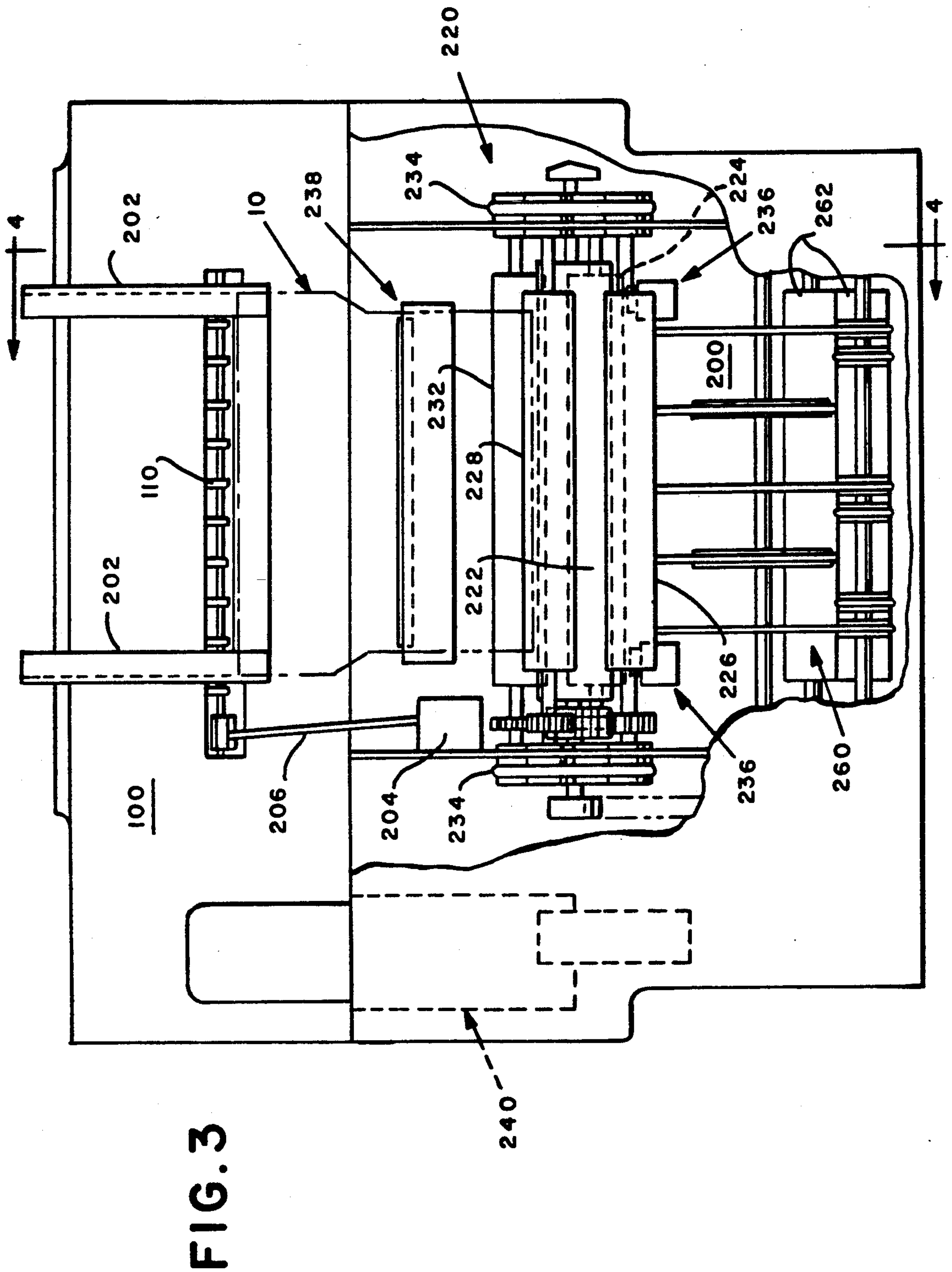
FIG. 3 shows a rear elevation, partially broken away, of apparatus in accordance with the subject invention.
Figure 4:
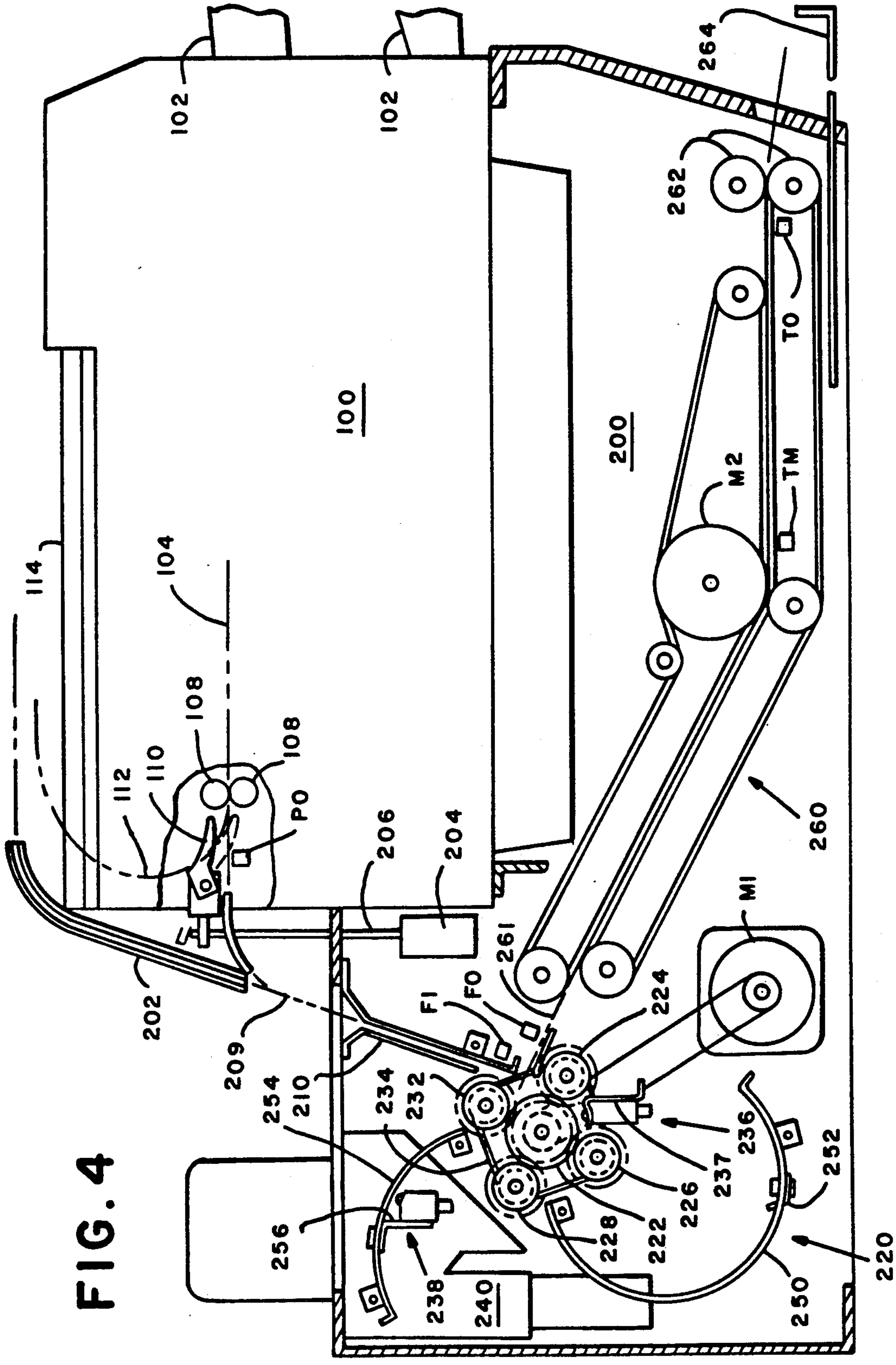
FIG. 4 shows a section taken along lines A—A of the apparatus of FIG. 3.

Turning to FIGS. 3 and 4, a preferred embodiment of the subject invention is shown. This embodiment comprises a substantially conventional printer of the type which is known for printing output from a personal computer, and preferably is a laser printer such as those manufactured by the Hewlett-Packard Company under the trade name "Laser Jet". As will be described further below, minor modifications have been made to printer 100 to facilitate its incorporation into the described embodiment of the subject invention. Other than these modifications, the operation of printer 100 is conventional and well understood. Accordingly, only details of the operation of printer 100 necessary for an understanding of the subject invention will be describe further.

Printer 100 include a pair of input trays 102*u*,1021 for input of sheets stock. Trays 102*u* and 1021 are mechanically coded to indicate the type of sheet stock contained in each tray, and therefore, in accordance with the subject invention, form sheet 10 may be fed from either tray 102*u*, or 1021, while the other is used to feed conventional letter stock.

Assuming that a form sheet 10 is selected and printed, in a conventional manner, with information as shown in FIG. 2; after printing form sheet 10 is urged along path 104 by final rollers 108 to exit printer 100 below deflector 110, which is shown in a raised position. As will be described below, if standard letter stock is selected, or if a jam is detected, deflector 110 is switched to its lower position to output a sheet along path 112 to upper output tray 114.

Printer 100 also includes a conventional sensor PO, to detect when form 10 is output by printer 100 and clear of rollers 108.

As it is printed by printer 100, form 10 progresses to folder-sealer 200 for preparation as a self-mailer.

In order to adapt printer 100 to the embodiment of the subject invention shown, printer 100 is modified by the addition of manual input guides 202 for manual input of form sheets 10 to folder-sealer 200 and by adapting diverter 110 for control by solenoid 204 and operating shaft 206, which is preferably made flexible to allow the cover of printer 100 to open.

As form sheet 10 is output by printer 100, it is guided along path 209 by guides 210 to folding apparatus 220.

Folding apparatus 220 includes a central roller 222, which is preferably formed by an elastomer, around which are arranged in peripheral contact a first, alignment roller, which captures and aligns form sheet 10 in a known manner; a second, urge roller 226; a first, fold roller 228, which folds form sheet 10 along linc F1; and a final fold roller 232, which folds form sheet 10 along lines F2-1, -2. Rollers 224, 226, 228, and 232 are held in tangential contact with central roller 222 by a conventional garter spring 234 and are conventionally mounted to allow radial displacement against the restoring force of spring 234 as form sheet 10 passes through folder 220.

Mechanisms 236 are positioned between rollers 224 and 226 to moisten the lateral edges of upper portion 20 of form sheet 10 as it is folded to prepare a self-mailer. Guide 237 extends between sealing mechanisms 236 to form rolling loop L (FIG. 8) in form sheet 10, as will be described below. In the embodiment shown, mechanisms 236 are moisteners for moistening glue strip 29 along the lateral edges of upper portion 20, but it is also within the contemplation of the subject invention that form sheet 10 may be sealed by the application of a glue during the folding and sealing process, or by other means.

A similar, but extended, sealing apparatus 238 is provided to seal the upper, transverse edge of upper portion 20 of form sheet 10. Water for sealing mechanisms 236 and 238 is provided by fluid supply system 240.

Supply System 240 maintains two separate hydrostatic heads for sealing mechanisms 236 and 238, which are at separate heights, in a conventional manner which is described in U.S. Pat. No. 2,374,076; to Burckhardt et al., which is hereby incorporated by reference.

After passing sealing mechanism 236, form sheet 10 is urged by roller 226 into buckle chute 250 until it reaches stop 254, and buckles and is captured by the nip of first, fold roller 228 which folds form sheet 10 and urges it into buckle chute 254 until it reaches stop 256 and buckles into the nip of final, fold roller 232 for final folding.

Folder 220 also includes sensor FI to detect the input of form sheet 10 and sensor OF to detect the output of form sheet 10, and is driven by motor M1.

After final folding, form sheet 10, which is now folded and sealed to prepare a self- mailer, is urged by final roller 232 to transport mechanism 260 which transports form sheet 10 along a path extending below printer 100. As can be seen from examination of FIG. 4, an important feature of the subject invention is the arrangement of folder 220 so that the input path 209 and output path 261 cross at an angle substantially equal to, or greater than, 90 degrees. This arrangement allows transport 260 to extend back beneath printer 100 in an arrangement which allows transport 260 to provide sufficient transport time so that the seals of form sheet 10 will have time to firmly adhere without substantially increasing the surface area occupied by the apparatus of the embodiment shown. This is a particularly important advantage in desk top office equipment where the "foot print" occupied is a critical feature.

Since input path 209 crosses exit path 261, folder 220 is designed with the circumference of central roller 222 greater than the length, after folding and sealing of form 10, so that the leading edge of form 10 will not interfere with the trailing edge as form 10 is output from folder 220 after folding and sealing. Also, to assure jam-free operation, motor M1 drives folder 220 at a rate sufficiently great with respect to the printing rate of printer 100 that form 10 will not interfere with the next successive form even when printer 100 is printing forms at its maximum rate.

Transport 260 is substantially a conventional transport of a type well known in the mail processing art for the transport of mail pieces and need not be discussed in detail here for an understanding of the subject invention. Transport 260 is driven by motor M2 at a rate selected to allow sufficient time for adhesive 229 to adhere securely. This is achieved by operating transport 260 at a speed slower than the printing speed of printer 100, and providing a length great enough so that transport 260 may contain two or more mail pieces simultaneously. Transport 260 also includes final squeeze rollers 262, to assure a good seal of form 10, and sensors TM and TO.

After folding and sealing and transport form 10 is output as a self-mailer into lower output tray 264.

Figure 5:
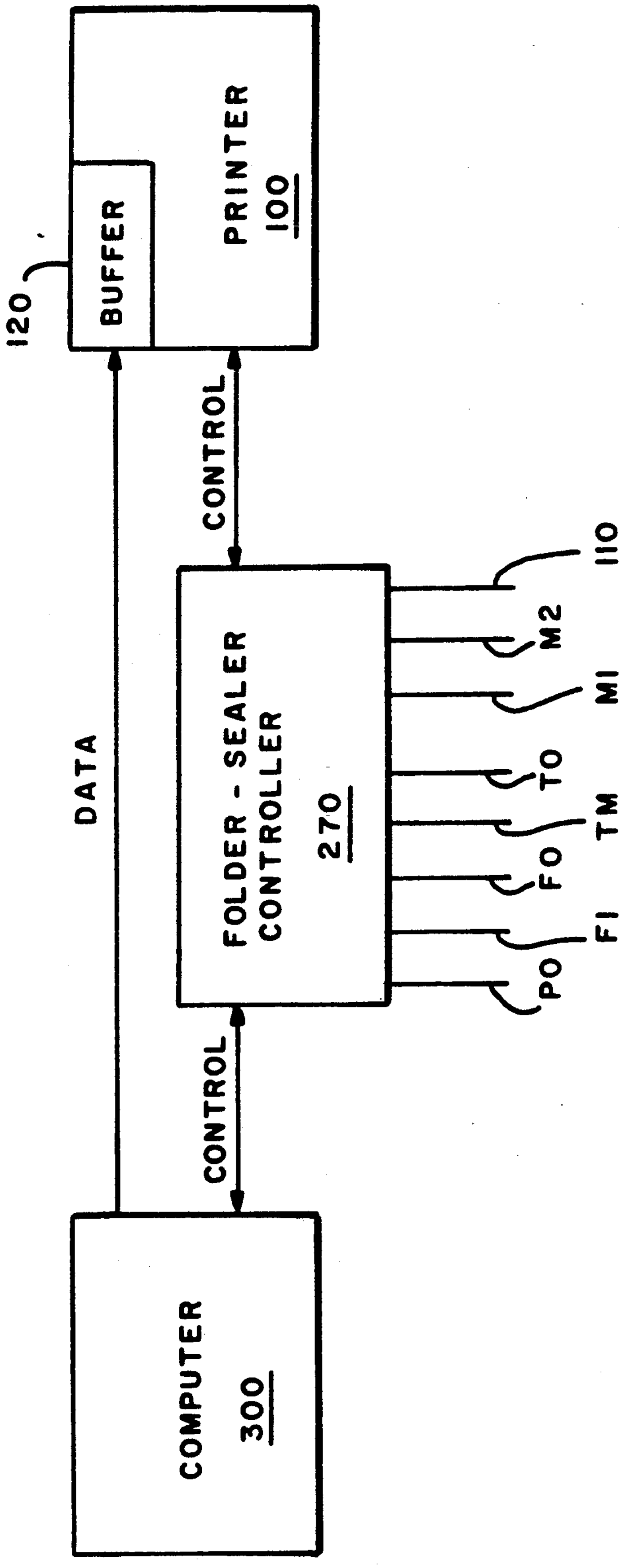
FIG. 5 shows a schematic block diagram of a control system for apparatus in accordance with the subject invention.

FIG. 5 shows a schematic block diagram of the control for the system of the preferred embodiment of the subject invention. Controller 270 is based on a known, commercially available microprocessor, which is preferably a Intel-Model 80196, and monitors control signals between printer 100 and computer 300. Controller 270 also receives inputs from sensors PO,FI,FO,TM, and TO. Controller 270 monitors the control signals exchanged between printer 100 and computer 300 to determine when a copy of a form sheet 10 is to be printed and otherwise passes the signals without modification so that printer 100 is controlled by computer 300 in a purely conventional manner as is well understood by those skilled in the art. It should also be noted that computer 300 transfers data for one or more pages of text to be printed by printer 100 to printer buffer 120. When controller 270 determines that a copy of form 10 is to be printed and prepared as a self-mailer it responds to inputs from sensors PO,FO,FI,FO,TM, and TO to control motors M1 and M2, and deflector 110 through solenoid 204 to operate folder sealer 200 as will be described below.

Figure 6:
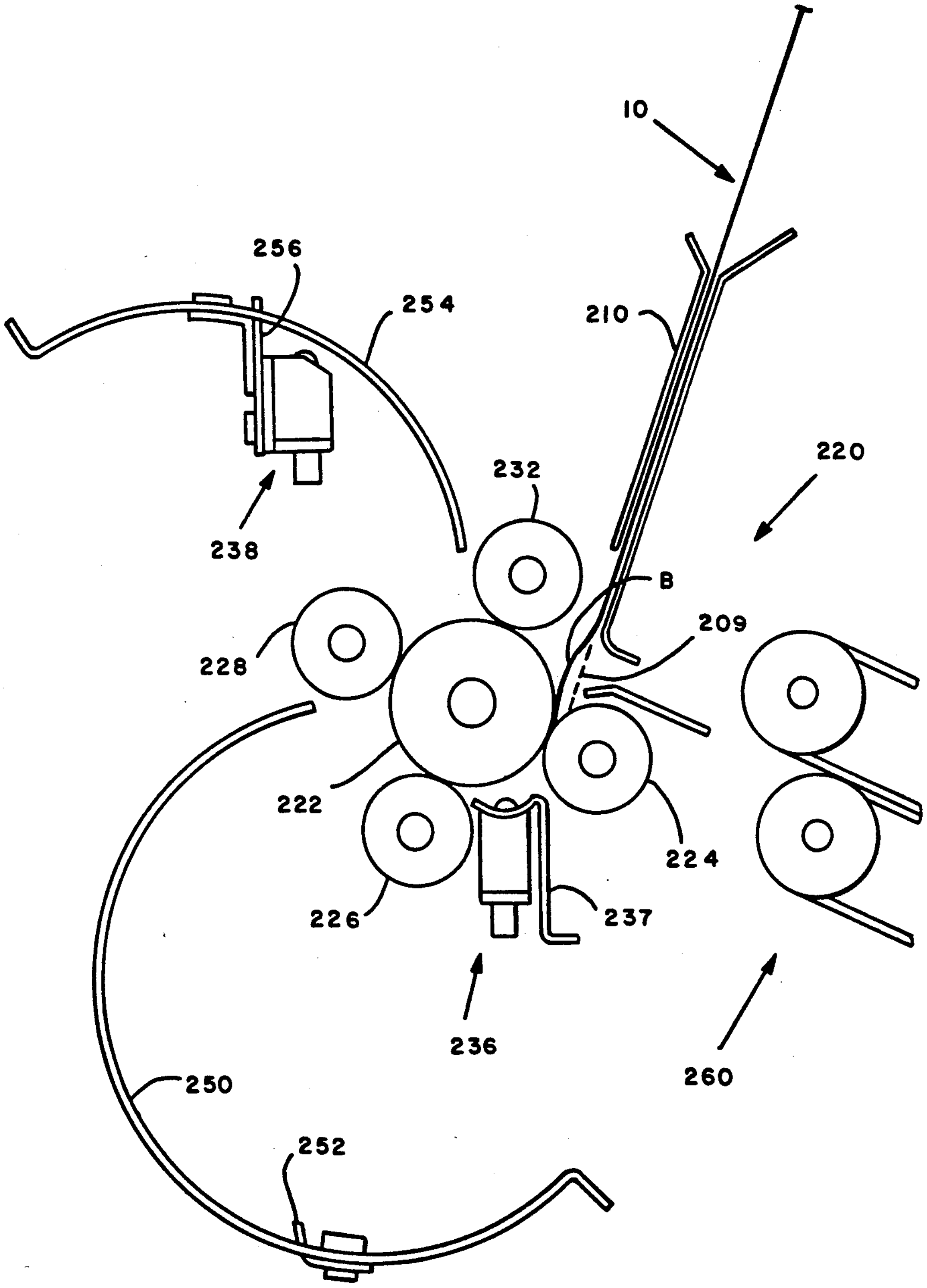
FIGS. 6–8 show a schematic representation of a portion of the operation of apparatus in accordance with the subject invention.

Turning now to FIGS. 6–13, the operation of folder 220 will be described in further detail. In FIG. 6 form 10 advances along path 209 guided by guide 210 until it encounters the circumference of roller 224. Form 10 then slides across the circumference of roller 224 until it is engaged in the nip formed between roller 224 and central roller 222. At this time folder 220 is jogged to engage the leading edge of form 10 and the nip between rollers 222 and 224, assuring that the leading edge of form 10 is aligned parallel to the axis of rollers 222 and 224, in a conventional alignment operation well known to those skilled in the arts. Any skew in the direction in which form 10 is input to folder 220 will be absorbed by bulge B which forms downstream of the leading edge of form 10 after it is engaged by the nip.

To facilitate alignment of form sheet 10, roller 224 preferably will have a hard smooth surface so that form sheet 10 will slide smoothly across the surface of roller 224 into the nip. Preferably roller 224 is machined from a metal such as aluminum to obtain these characteristics.

Figure 7:
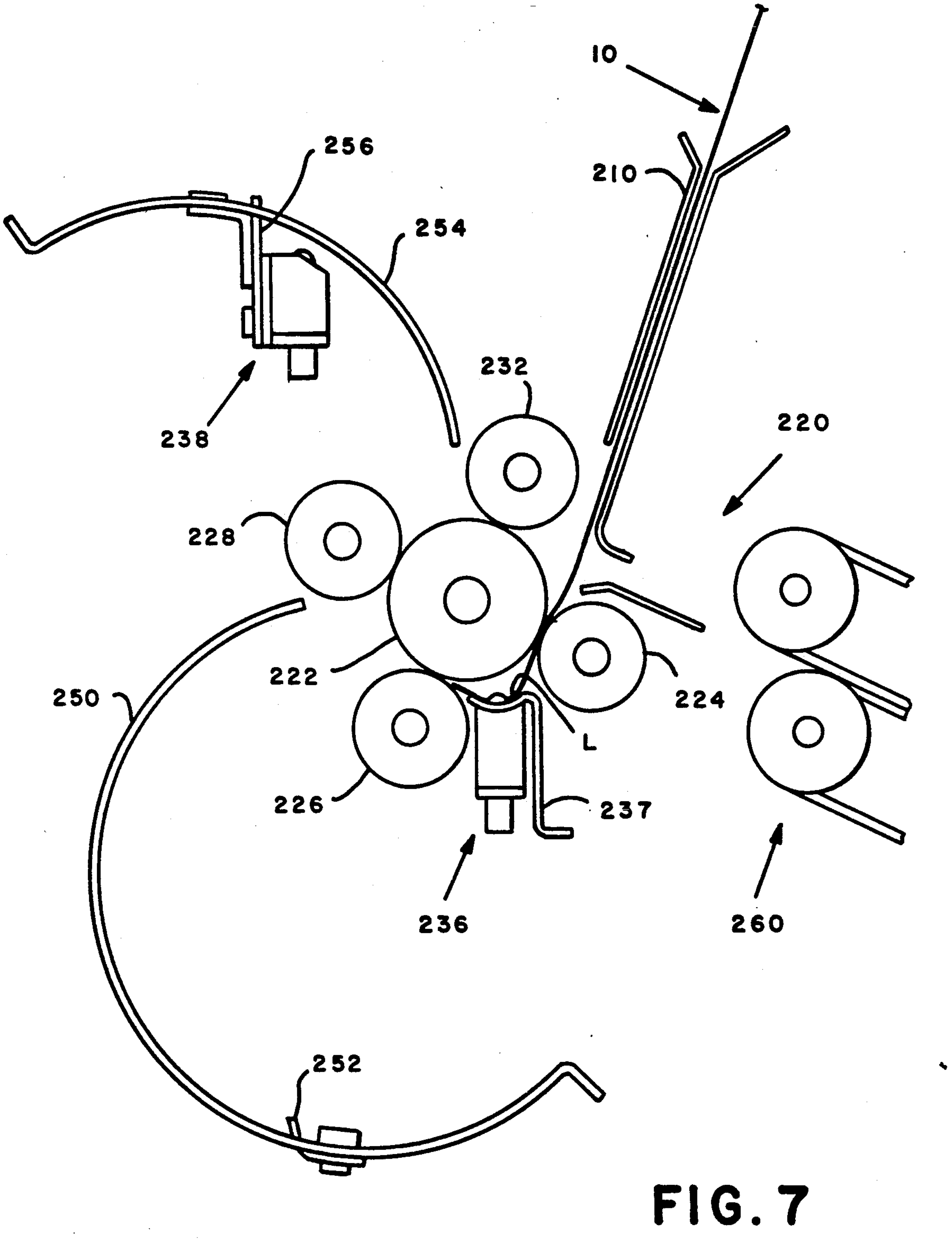

FIG. 7 shows the next step in the folding and sealing operation which begins after form 10 is clear from rollers 108. At this time, folder 220 begins continuous operation and form 10 advances until it contacts guide 237 and moisteners 236 where it is deflected into the nip formed by roller 226 and central roller 222 which urges form 10 into buckle chute 250. Guide 237 extends between moisteners 236 and is contoured to establish a rolling loop L (FIG. 7) spaced from roller 222 in form sheet 10 which directs form sheet 10 into the nip formed by rollers 226 and 222. Loop L assures that moisture is not transferred to the surface of roller 222 by moisteners 236. To assure that form sheet 10 moves through both nips at the same rate, and Loop L is therefore maintained, roller 226 preferably has the same characteristics of smoothness and hardness as roller 224. Note that form 10 is fed with lower portion 30 leading so that while it is deflected by guide 237, no moistening action takes place until upper portion 20 advances across moisteners 236.

Buckle chutes 250 and 254 are preferably opened, curved, one-sided buckle chutes, as described in U.S. Pat. No. 4,834,699, which is hereby incorporated by reference.

Figure 8:
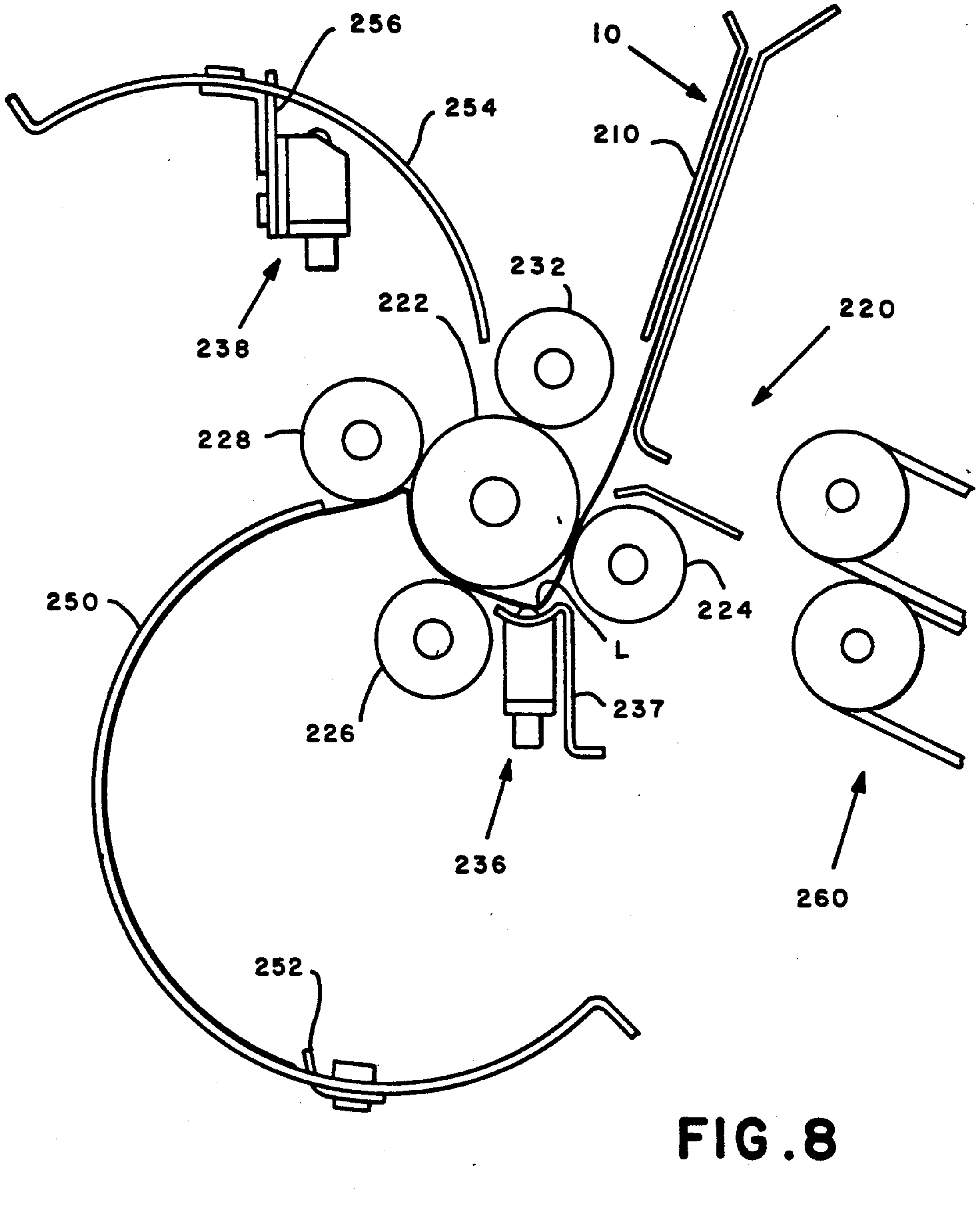
Figure 9:
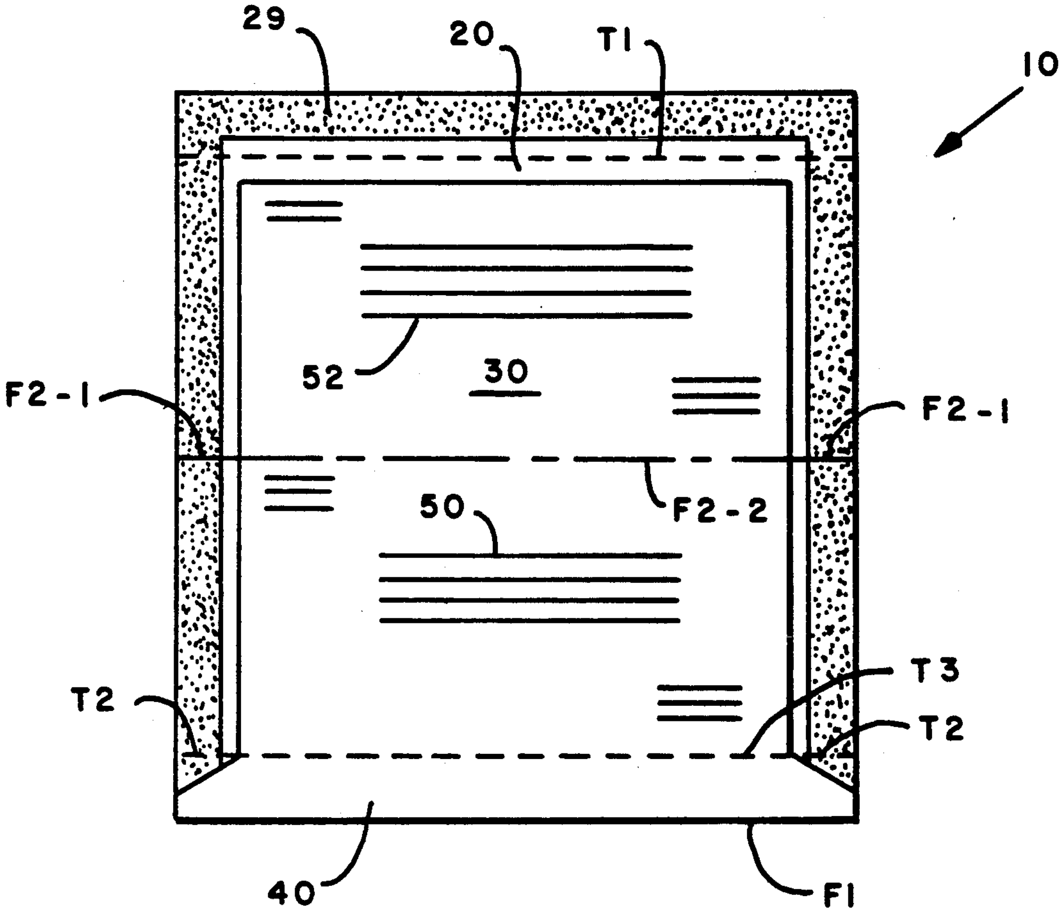
FIG. 9 shows the form sheet of FIGS. 1 and 2 after the operation of FIGS. 6–8.

FIG. 8 shows form 10 urged into buckle chute 250 by roller 226 until the leading edge reaches stop 252. Just prior to this point upper portion 20 has reached moistener 236 and moisture is being applied to adhesive 29 along the lateral edges of upper portion 20. Roller 226 continues to urge form 10 against the resistance of stop 252 until form sheet 10 buckles at fold line F1 into the nip formed by rollers 228 and 222. At this point form sheet 10 has been folded once along fold line F1, as is shown in FIG. 9, with the obverse sides of upper portion 20 and lower portion 30 in contact.

Figures 10, 10A, 10B:
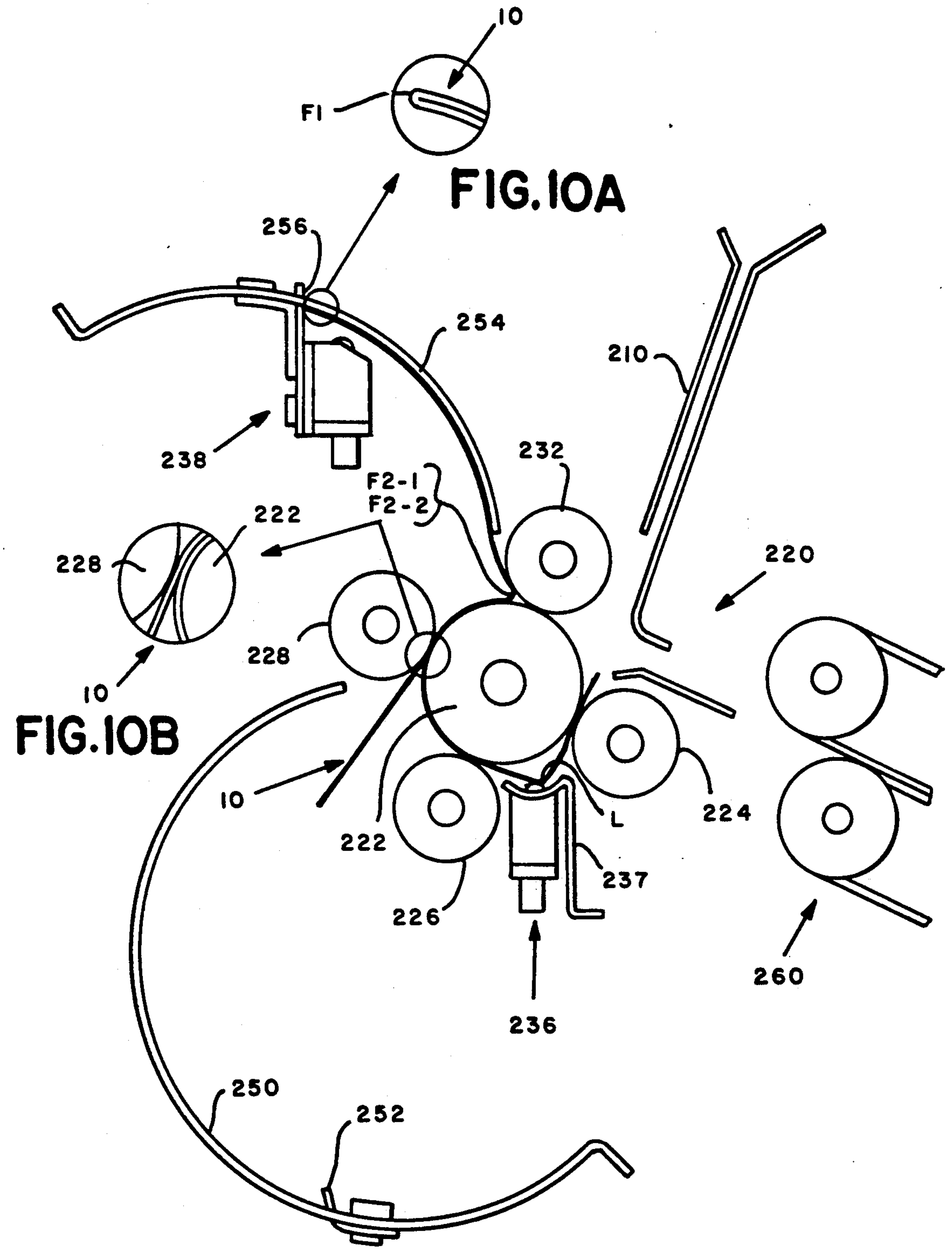
FIGS. 10, 10A, 10B, 11, 11A, 12, and 12A show the following portion of the operation of apparatus in accordance with the subject invention.

In FIG. 10 roller 228 continues to urge form 10, now folded once, into buckle chute 254 until the leading edge, i.e. fold line F1, reaches stop 256. As roller 228 continues to urge form sheet 10 against the resistance of stop 256, form sheet 10 buckles into the nip formed between central roller 222 and roller 232 at fold lines F2-1 and F2-2.

Figures 11, 11A:
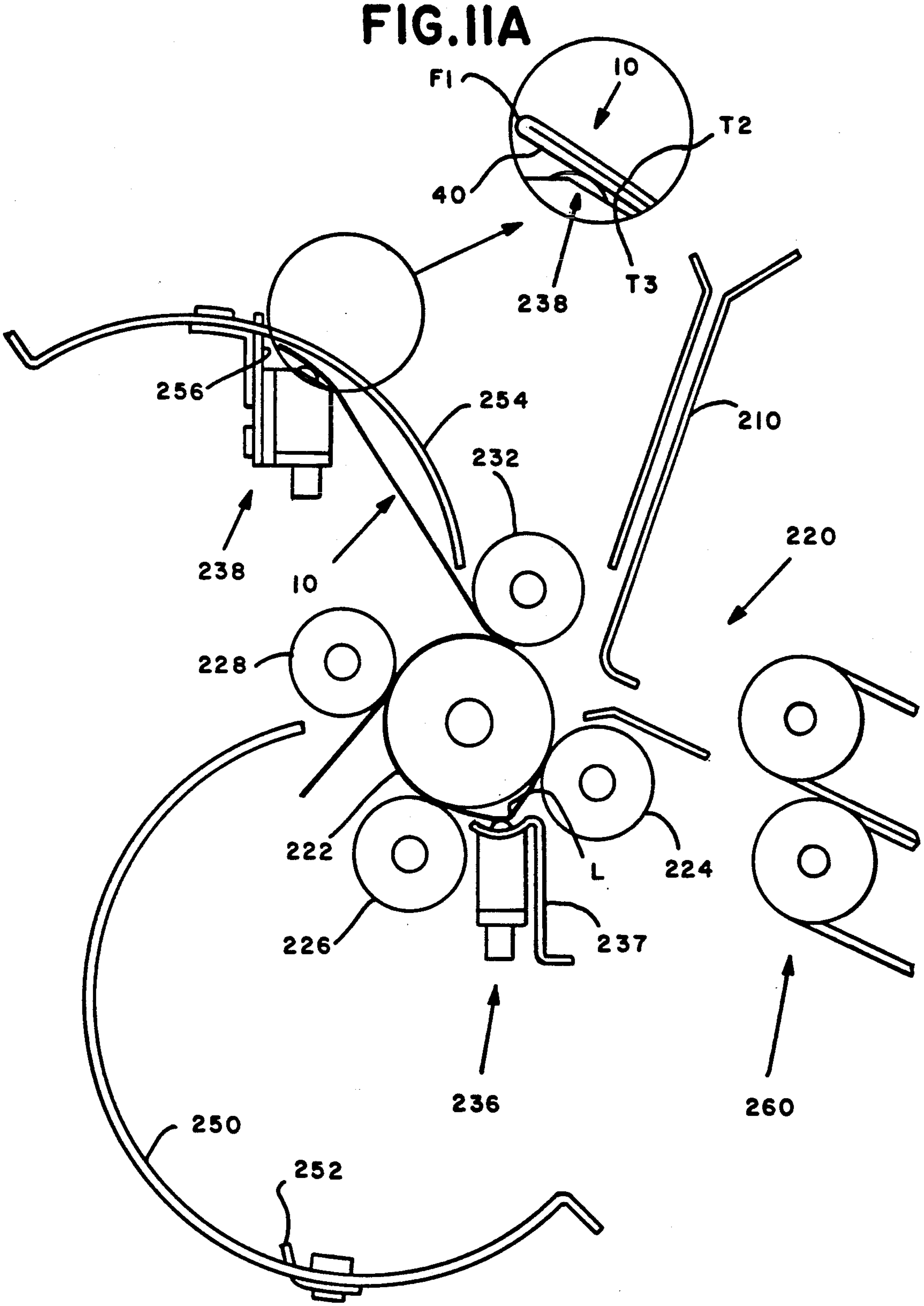

In FIG. 11 form sheet 10 is captured by rollers 232 and 222 and drawn away from the concave surface of buckle chute 254 and into contact with moistener 238 so that moisture is applied across the length of connecting portion 40.

Figures 12, 12A:
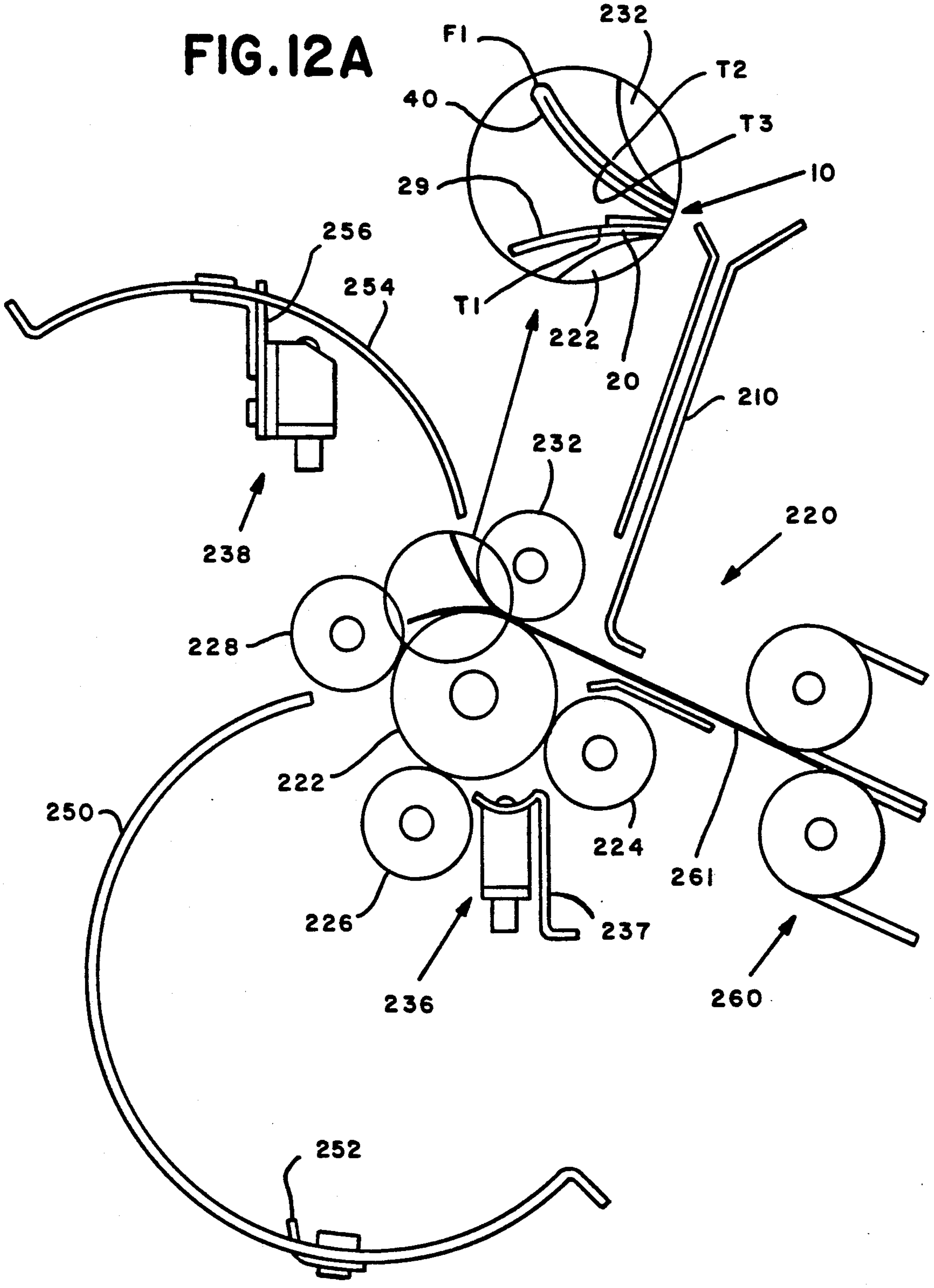

In FIG. 12 form sheet 10 is urged along exit path 261 by roller 232. As can be seen in the detail, connecting portion 40, which has been moistened, is brought into contact with adhesive 29 along the trailing lateral edge of upper portion 20 and tear lines T1, T2, and T3 are aligned.

Figure 13:
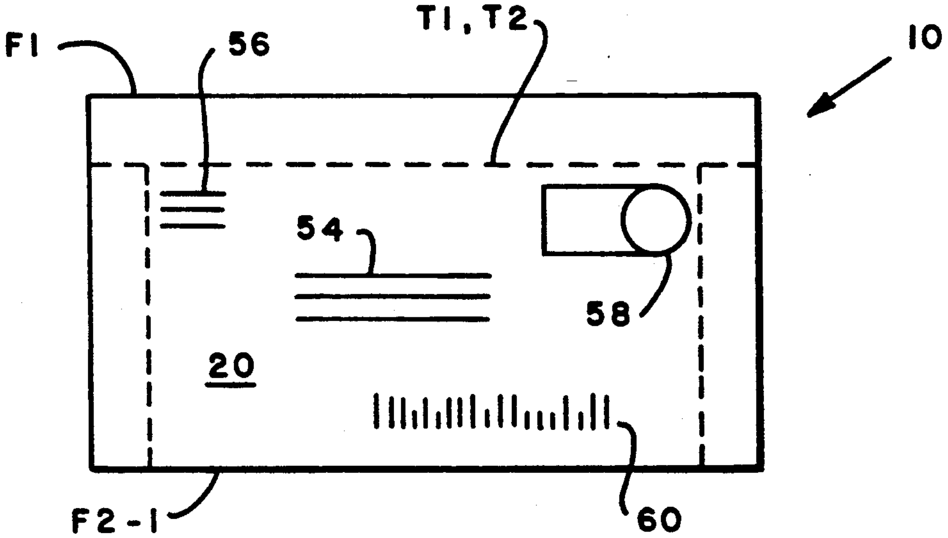
FIG. 13 shows the form sheet of FIGS. 1 and 2 after final folding and sealing.

FIG. 13 shows form sheet 10 as folded and sealed to form a self-mailer.

Figure 14:
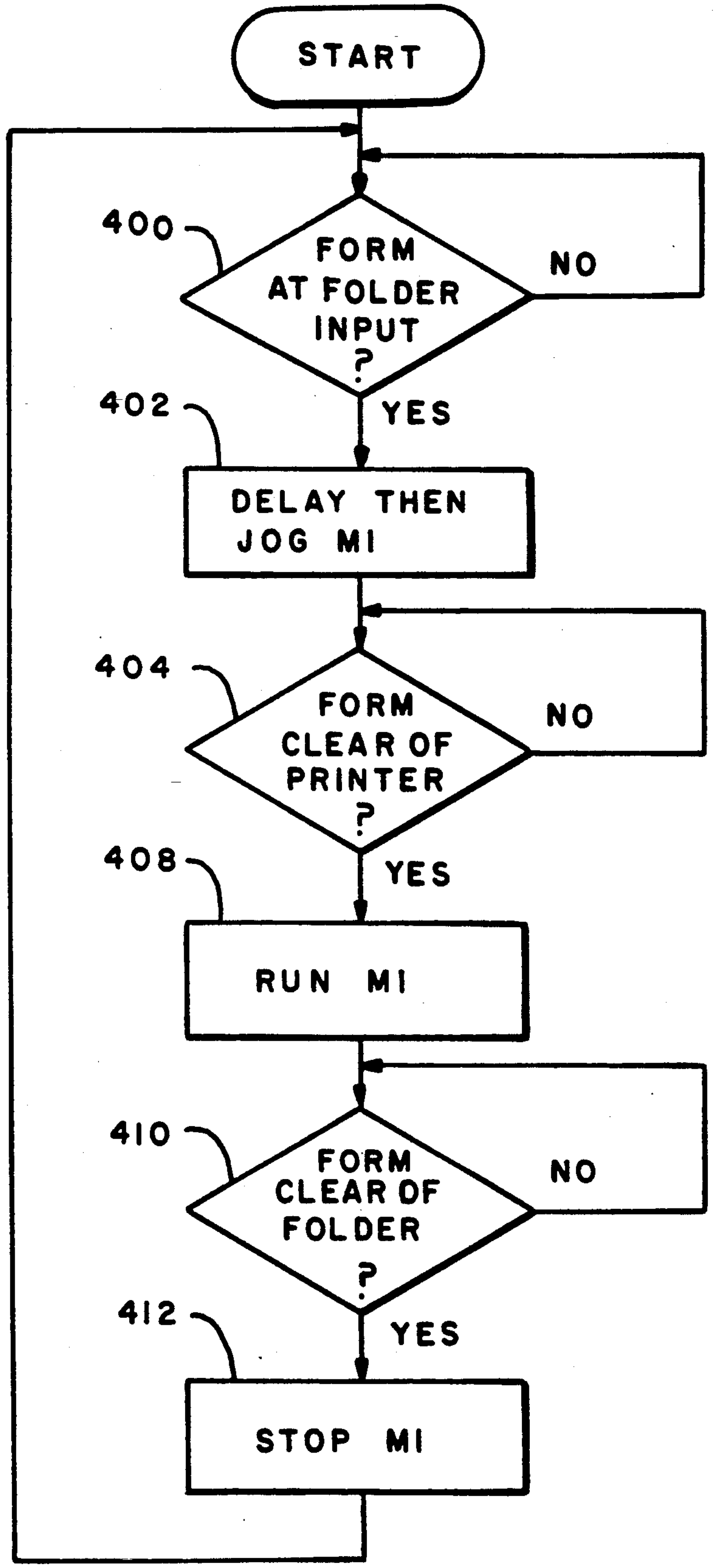
FIG. 14 shows a flow chart of the operation of the controller of FIG. 5 in controlling a folder in accordance with the subject invention.

FIG. 14 shows a flow chart of the operation of controller 270 in controlling motor M1. At 400 controller 270 monitors sensor FI to determine if form sheet 10 is at the input to folder 220. Controller 270 continues to loop through 400 until form sheet 10 is detected at sensor FI. Controller 270 then delays for a predetermined period, which may be easily determined by calculation or measurement for a particular system, to assure that form sheet 10 is engaged by the nip of central roller 222 and first, alignment roller 224. After the delay, controller 270 operates motor M1 to jog folder 220 to assure that form sheet 10 is engaged by the nip of rollers 222 and 224, thus assuring alignment of form sheet 10, as described above. Then at 404 controller 270 monitors the input from sensor PO to determine if form sheet 10 is clear of rollers 108. Controller 270 continues to loop through 404 until it determines that sensor PO is no longer blocked by form sheet 10 and then at 408 runs motor M1 to operate folder 220. As noted above, folder 220 is operated at a rate chosen sufficiently great so that even if a second form sheet is immediately printed, form sheet 10 will be folded and sealed and output to transport 260 without interference. Then at 410 controller 270 monitors sensor OF to determine if form sheet 10 is clear of folder 220. Controller 270 continues to loop through 410 until sensor OF is blocked then unblocked by form sheet 10, then at 412 stops motor M1 and returns to 400 to await input of the next form sheet.

Figure 15:
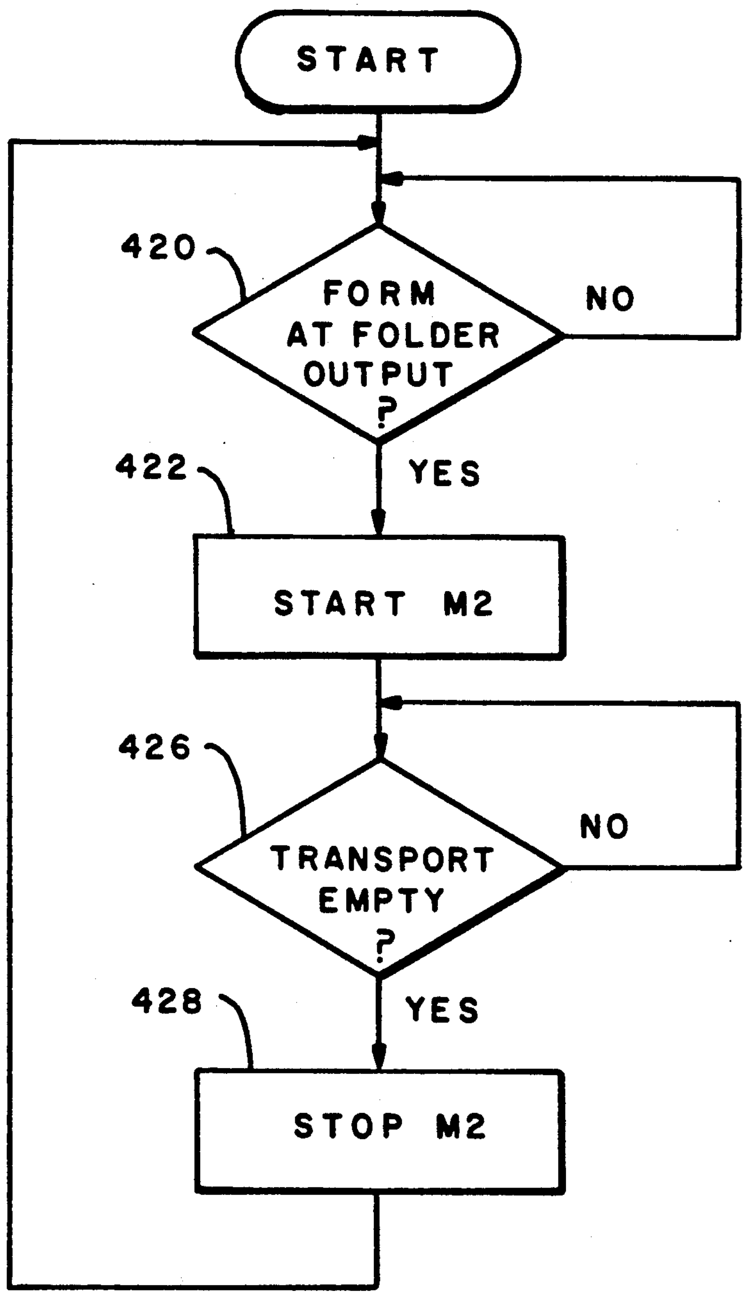
FIG. 15 shows a flow chart of the operation of the controller of FIG. 5 in controlling a transport in accordance with the subject invention.

FIG. 15 shows a flow chart of the operation of controller 270 in controlling motor M2 which drives transport to 60. At 420 controller 270 determines if form sheet 10 blocks sensor OF and thus is at the output of folder 220. Controller 270 continues to loop through 420 until form sheet 10 blocks sensor OF and then at 422 controls motor M2 to start. Then at 426 controller 270 tests to determine if transport 260 is empty. That is controller 270 monitors sensors TO and OF to determine if form sheet 10 has been output through squeeze rollers 262 to lower output tray 264 and no following form sheets have been sensed by sensor OF. As discussed above, transport 260 operates at a slower speed than printer 100 so as to allow time for adhesive 29 to adhere properly, and accordingly is designed to transport two self-mailers simultaneously. Controller 270 loops through 226 until it determines that transport 260 is empty and then at 228 stops motor M2 and returns to 420 to await the input of the next form sheet.

Figure 16:
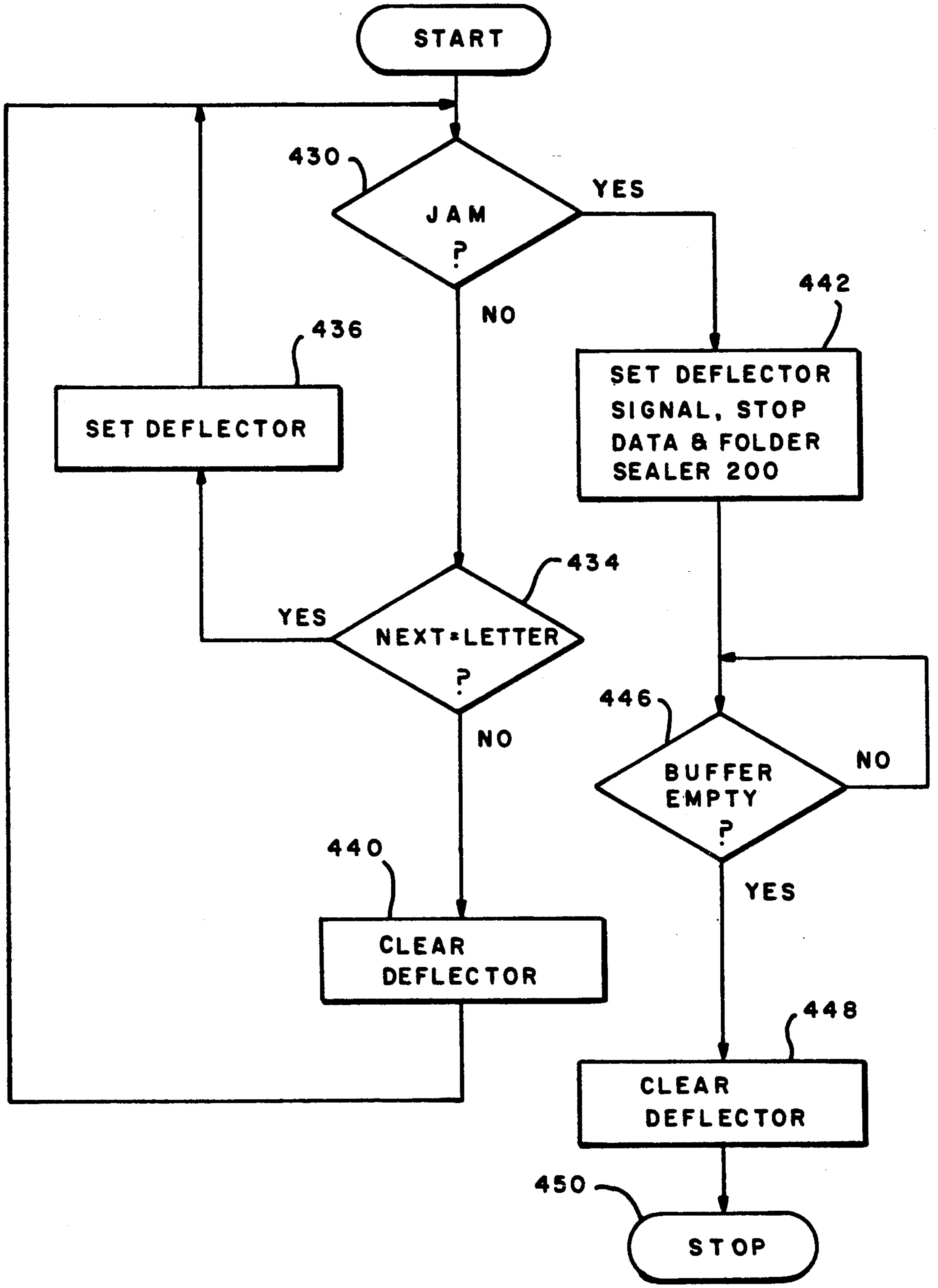
FIG. 16 shows a flow chart of the operation of the controller of FIG. 5 in controlling a diverter for directing the output of a printer in accordance with the subject invention.

FIG. 16 shows a flow chart of the operation of controller 220 in controlling deflector 110 through solenoid 204 and flexible operating rod 206. At 430 controller 270 monitors sensors FI, OF, TM, and TO to determine if there is a jam in folder sealer 200. A jam is detected when form sheet 10 blocks one of these sensors and fails to unblock the sensor within a predetermined time, or if after form sheet 10 is detected at one sensor it is not detected at the next sensor within a predetermined time. Appropriate times may be determined for particular systems by a simple calculation or measurement. If no jam condition is detected at 430, then at 434 controller 270 monitors the command signals transmitted between computer 300 and printer 100 to determine if the next item to be printed is a letter, i.e. is not a copy of form sheet 10. If the next item to be printed is to be printed on letter stock, at 436 controller 270 sets deflector 110 so that the letter stock is diverted along path 112 to upper output tray 114 in a conventional manner. If the next item is to be printed on form sheet 10, then at 440 controller 270 clears deflector 110 so that form sheet 10 will be processed as described above.

Returning to 430, if a jam is detected then at 442 controller 270 sets deflector 110, signals computer 300 to stop transmitting data and stops motors M1 and M2 to halt folder sealer 200. However, since printer 100 may contain data for printing additional pages in its buffer 120, printer 100 will continue to print in a conventional manner until buffer 120 is empty. Since deflector 110 is set, these pages will be diverted from folder sealer 200 along path 112 to upper output tray 114. At 446 controller 270 determines that buffer 120 is empty and then at 448 clears deflector 110 then stops at 450 until the jam is cleared.

Thus, it can be seen that even in the event a jam occurs in folder sealer 200, the data for successive forms in buffer 120 will not be lost.

Once the jam has been cleared from folder sealer 200, the operator may manually restart folder sealer 200 and take the successive form sheets from upper output tray 114 and manually insert them into folder sealer 200 along input path 209 using guides 202. Guides 202 are set equal in width to the width of upper portion 20 of form sheet 10 and will align form sheet 10 with input guides 210 as though form sheet 10 had been output by printer 100. The curve in guides 202 shown in FIG. 3 is advantageous in two ways, it stiffens form sheet 10 against lateral forces; helping to assure that form sheet 10 will be properly aligned when manually inserted, and it facilitates manual insertion of form sheet 10 by an operator standing in front of the apparatus.

Figures 17, 18:
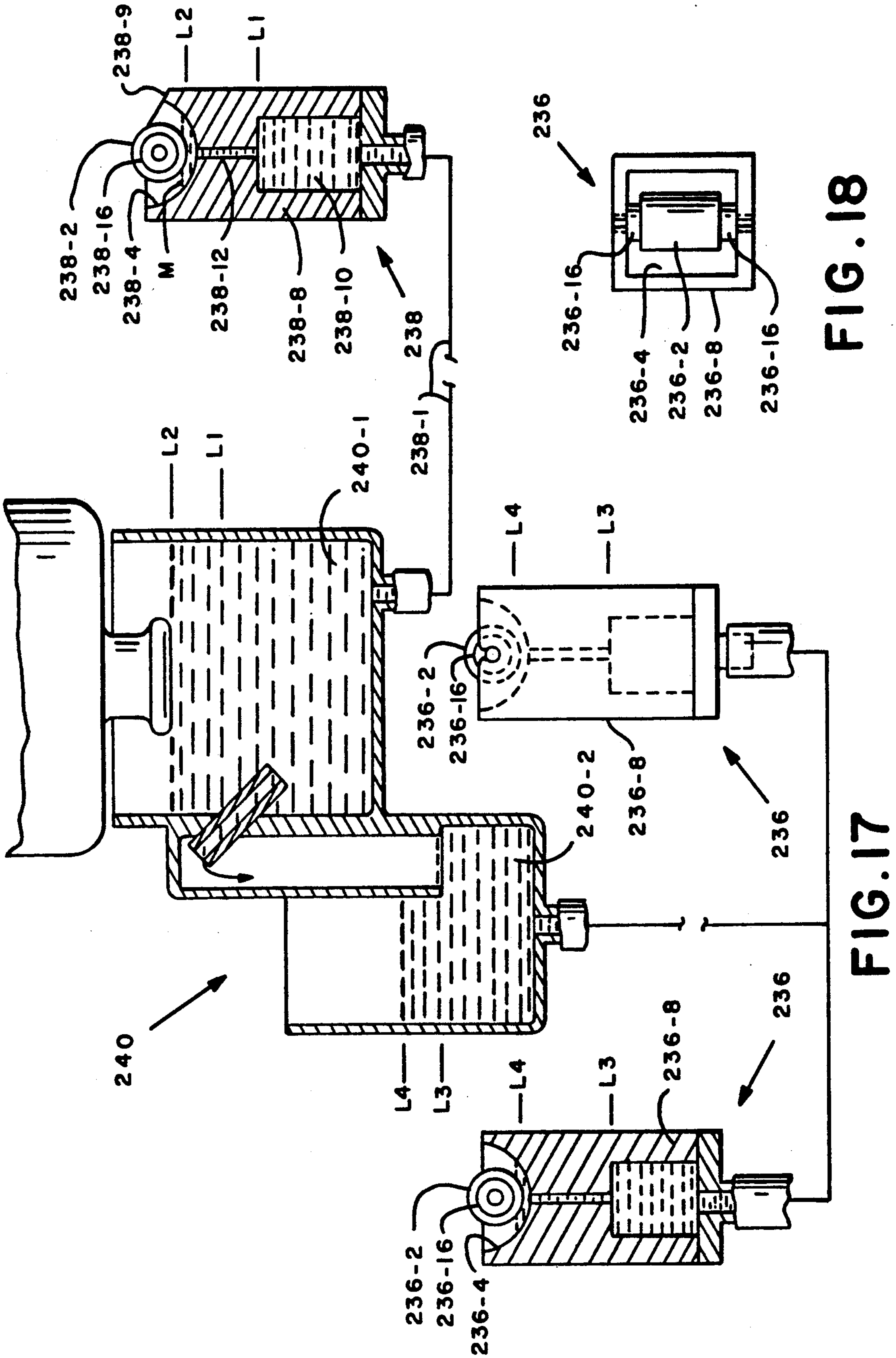
FIGS. 17 and 18 show a moistening apparatus useful with apparatus in accordance with the subject invention.

FIGS. 17 and 18 show a schematic representation of the moistening system of the preferred embodiment of the subject invention. As described in the above cited U.S. Pat. No. 2,374,076, fluid supply system 240 maintains two reservoirs 240-1 and 240-2 for supplying moistening apparatus 238 and 236 respectively. As shown, reservoir 240-1 will vary between levels L1 and L2, while reservoir 240-2 will vary between levels L3 and L4.

Moistening apparatus 238 is connected to reservoir 240-1 by fluid supply tubing 238-1. Apparatus 238 comprises a roller 238-2 mounted in a trough 238-4 provided in the top of body 238-8. Roller 238-2 may be smooth to minimize transfer of adhesive from form 10 to apparatus 238, and is preferably formed with a hydrophillic surface to assure adequate moistening. The length of roller 238-2 and 238-4 is substantially equal to the width of connecting portion 40 of form sheet 10 and a bevel 238-9 is provided in body 238-8 to facilitate moistening of connecting portion 40 as form sheet 10 is withdrawn from buckle chute 254 as shown in FIG. 11. Body 238-8 also contains primary reservoir 238-10 which is connected to trough 238-4 by capillary tube 238-12. Capillary tube 238-12 is approximately 0.060 inches wide and extends substantially for the full length of trough 238-4. Reservoir 240-1 is so designed and positioned that level L1 is sufficiently high that primary reservoir 238-10 is maintained full and the length of capillary 238-12 is chosen with respect to level L2 so that level L2 is approximately at or below the bottom of trough 238-4.

Thus, meniscus of water M is maintained at a substantially constant level in the bottom of trough 238-4 to moisten roller 238-2. As form sheet 10 moves across roller 238-2 the roller rotates through meniscus M and picks up a substantially continuous sheet of water to moisten connecting portion 40. It has been found that it is desirable to reduce the diameter of roller 238-2 as much as is practicable in order to assure a smooth continuous sheeting action of the water picked up by roller 230-2 from meniscus M. The lower limits of this diameter result from the need to assure a smooth continuous rotation of roller 238-2 as form sheet 10 passes across it. If the diameter becomes too small, the rotation becomes irregular and moistening is adversely affected. Diameters of between approximately 0.12 and 0.25 inches, and preferably approximately 0.19 inches, have been found to be effective. The gap between roller 238-2 and trough 238-4 widens from approximately 0.03 inches, at the bottom, to approximately 0.125 inches so as to prevent capillary action causing trough 238-4 to overflow.

FIG. 17 also shows moistening apparatus 236 which are provided to moisten adhesive 29 along the lateral edges of upper portion 20. These apparatus are positioned with respect to levels L3 and L4 of reservoir 240 in the same manner as moistening apparatus 238 is positioned with respect to levels L1 and L2 and are substantially identical to apparatus 238. They differ only in that body 236-8 does not include a bevel and in having a shorter length, and need not be discussed further here for an understanding of the subject invention.

FIG. 18 shows a top view of moistening apparatus 236. As can be seen, roller 236-2 is mounted in trough 236-4 provided in body 236-8, as described above. Hubs 236-16, approximately 0.075 inches long, are provided to prevent capillary action between the ends of roller 236-2 and the ends of trough 236-4 which, if it occurred, might cause overflow of trough 238-4. Similar hubs 238-16 are provided in apparatus 238.

The above embodiments of the subject invention have been described by way of illustration only, and other embodiments of the subject invention will be apparent to those skilled in the art from consideration of the detailed description given above and the attached drawings. Accordingly, limitations on the subject invention are to be found only in the claims set forth below.

What is claimed is:

1. Apparatus for processing a form sheet to prepare a self-mailer, said form sheet being a continuous sheet having obverse and reverse sides and including a first continuous portion and a second continuous portion, said apparatus comprising:

a) printing means, responsive to text signals defining information to be printed, for printing said reverse side of said first portion with address information; and b) folder means for receiving said form sheet output from said printing means and folding said form sheet to prepare said self-mailer so that said self-mailer comprises an envelope having a front panel and a back panel, said folder means further comprising:

b1) first means for folding said form sheet about a first transverse line to bring said obverse side of said second portion in contact with said obverse side of said first portion;

b2) second means for then folding said first and second portions about a second transverse line so that said first portion forms said envelope, with said reverse side forming the outside of said envelope and said second portion being essentially fully enclosed between and adjacent to said front and back panels; and wherein, b3) said folder means has an input path for input of said form sheet and an exit path for output of said form sheet after folding, said input path crossing said exit path.

2. Apparatus as described in claim 1 wherein said address information includes a machine readable code.

3. Apparatus as described in claim 1 wherein said printing means imprints said second portion with message information.

4. Apparatus as described in claim 3 wherein said folder means further comprising means for sealing said self-mailer.

5. Apparatus as described in claim 4 wherein:

a) said printer means is positioned above said folder means and outputs said printed form sheet in a downwards direction for receipt by said folder means; and, b) said folder means further comprises transport means for transporting said form sheet after folding and sealing to prepare said mailer, said transport means extending beneath said printing means to output said self-mailer adjacent to the point where said form sheet is input to said printing means, whereby the surface area occupied by said apparatus is reduced.

6. Apparatus as described in claim 5 wherein said printer means is substantially a desk top computer printer suitable for printing output from a personal computer.

7. Apparatus as described in claim 6 further comprising a) sheet feeder means for selectively feeding said form sheet or a sheet of letter stock in response to feed selection signals from said computer;

b) diverter means for selectively directing the output of said printer means to either said folder means or to an alternative output path for unfolded output;

c) control means responsive to said feed selection signals for controlling said diverter means to direct said printer output to said folder means when said sheet feeder means feeds said form sheet and to direct said printer output path to said alternative output when said sheet feeder feeds said sheet of letter stock.

8. Apparatus for processing a form sheet to prepare an envelope, comprising:

a) transport means for transporting said envelope in a substantially horizontal direction, said transport means having an input substantially horizontally spaced from an output;

b) printing means positioned above said transport means, and responsive to text signals defining information to be printed, for printing said form sheet with address information, said printing means having an input vertically spaced from and horizontally substantially adjacent to said output of said transport means, and an output vertically spaced from and horizontally substantially adjacent to said input means; and c) folder means for:

c1) receiving said form sheet as it is output from said printing means;

c2) folding said form sheet to form said envelope;

c3) as said form sheet is being folded changing the direction of motion of said form sheet such that when said form sheet is folded to form said envelope said envelope is moving in a direction substantially opposite to the direction of movement of said form sheet through said printing means; and, c4) transferring said envelope to said transport means for output.

9. Apparatus as described in claim 8 wherein said address information includes a machine readable code.

10. Apparatus as described in claim 8 wherein said printing means imprints a second portion of said form sheet with message information.

11. Apparatus as described in claim 8 further comprising means for sealing said envelope.

12. Apparatus as described in claim 8 wherein said printer means is substantially a desk top computer printer suitable for printing output from a personal computer.

13. Apparatus as described in claim 12 further comprising:

a) sheet feeder means for selectively feeding said form sheet or a sheet of letter stock in response to feed selection signals from said computer;

b) diverter means for selectively directing the output of said printer means to either said folder means or to an alternative output path for unfolded output;

c) control means responsive to said feed selection signals for directing said printer output to said folder means when said sheet feeder means feeds said form sheet and directing said printer output path to said alternative output when said sheet feeder feeds said sheet of letter stock.

14. An apparatus for preparing a self-mailer, comprising:

a) printing means, responsive to text signals defining information to be printed, for printing a form sheet with address information in a first portion of said form sheet; and, b) folder means for receiving said form sheet output from said printing means and folding said form sheet to prepare said self-mailer; wherein, c) said folder means further comprises:

c1) a central roller;

c2) a first roller forming a first nip with said central roller, said first nip being aligned with the input path of said form sheet so as to capture said form sheet for folding;

c3) a final roller forming a final nip with said central roller, said final nip being aligned to transport along an exit path, said exit path crossing said input path;

c4) means for folding said form sheet positioned intermediate said first and final rollers.

15. An apparatus as described in claim 14 wherein said self-mailer comprises:

a) an envelope imprinted on its outer surface with said address information and enclosing a second portion of said form sheet; and, b) a tear-off strip where removal separates said second portion from said envelope and simultaneously opens said envelope.

16. Apparatus as described in claim 15 wherein said address information includes a machine readable code.

17. Apparatus as described in claim 15 wherein said printing means imprints said second portion with message information.

18. Apparatus as described in claim 15 further comprising means for sealing said self-mailer.

19. Apparatus as described in claim 14 wherein:.

a) said printer means is positioned above said folder-sealer means and outputs said printed form sheet in a downwards direction for receipt by said folder means; and, b) said folder means further comprises transport means for transporting said form sheet after folding and sealing to prepare said mailer, said transport means extending beneath said printing means to output said self-mailer adjacent to the point where said form sheet is input to said printing means, whereby the surface areas occupied by said apparatus is reduced.

20. Apparatus as described in claim 14 wherein said printer means is substantially a desk top -computer printer suitable for printing output from a personal computer.

21. Apparatus as described in claim 14 further comprising:

a) sheet feeder means for selectively feeding said form sheet or a sheet of letter stock in response to feed selection signals from said computer;
b) diverter means for selectively feeding output of said printer means to either said folder means or to an alternative output path for unfolded output;
c) control means responsive to said feed selection signals for directing said printer output to said folder means when said sheet feeder means feeds said form sheet and directing said printer output path to said alternative output when said sheet feeder feeds said sheet of letter stock.

* * * * *